United States Patent
Chadwick

[11] 3,844,314
[45] Oct. 29, 1974

[54] TELESCOPIC SHOCK ABSORBER SHIELD TUBE

[75] Inventor: Stanley Vincent Chadwick, Wigan, England

[73] Assignee: General Motors Corporation, Detroit, Mich.

[22] Filed: Feb. 7, 1972

[21] Appl. No.: 224,049

[30] Foreign Application Priority Data
Feb. 25, 1971  Great Britain ..................... 5454/71

[52] U.S. Cl. ............................................... 138/109
[51] Int. Cl. .............................................. F16l 25/00
[58] Field of Search ........... 138/106, 107, 108, 109; 285/304, 260; 292/1; 220/24 R

[56] References Cited
UNITED STATES PATENTS

| | | | |
|---|---|---|---|
| 2,340,956 | 2/1944 | Gillette | 138/145 |
| 2,366,067 | 12/1944 | Smith | 285/260 X |

Primary Examiner—Jerry W. Myracle
Attorney, Agent, or Firm—J. C. Evans

[57] ABSTRACT

An injection-moulded polypropylene dust shield tube (stone guard) which can be mounted with a snap-on fit on a flange member carried by a piston rod of a telescopic shock absorber, primarily for use in a motor vehicle, comprises a hollow cylindrical body portion formed adjacent one end with two axially spaced rings of circumferentially equi-spaced internal projections forming internal castellations, arranged with the castellations of the two rings in alternating sequence, and with circumferential clearance between the alternate castellations of the two rings as seen in end elevation.

With this construction, the injection moulding may be carried out using a two-part mould core the two parts of which, after moulding, are withdrawn in opposite axial directions without riding over, and thereby possibly damaging, the newly formed internal castellations.

4 Claims, 5 Drawing Figures

TELESCOPIC SHOCK ABSORBER SHIELD TUBE

This invention relates to telescopic shock absorbers, for use in motor vehicles.

The invention is more particularly concerned with an injection-moulded polypropylene dust shield tube which can be mounted with a snap-on fit on a flange member carried by a piston rod of the shock absorber, such that the tube is effective to protect the working parts of the shock absorber from the entry of dirt and other foreign materials.

According to the invention, a dust shield tube for a telescopic shock absorber is injection-moulded from polypropylene plastics material and comprises a hollow cylindrical body portion formed adjacent one end with two axially spaced rings of circumferentially equi-spaced internal projections forming internal castellations, arranged with the castellations of one of the rings alternating with the castellations of the other ring, with circumferential clearance between the alternate castellations as seen in end elevation. This construction inter alia facilitates the injection moulding of the dust shield tube, and allows the use of a two-part mould core the two parts of which may be withdrawn in opposite axial directions without danger of damage to the castellations.

Conveniently, as seen in side elevation, the facing end surfaces of the castellations of the two rings extend radially of the longitudinal axis of the cylindrical body portion, and the axially opposite end surface of each castellation of the axially inner ring extends obliquely such that these opposite end surfaces form segments of an annular ramp from the internal surface of the body portion to the radially innermost portions of the castellations of the inner ring. A possible ramp angle is $180° - 30° = 150°$. This construction facilitates assembly of the dust shield tube on to a flange member carried by a piston rod of a telescopic shock absorber, and permits effective retention of the dust shield tube on the flange member.

There may be four castellations in each ring, with their centres displaced 45° circumferentially relative to the centres of the alternate castellations of the other ring. This number of castellations permits efficient retention of the dust shield tube on a flange member, and can be injection-moulded without difficulty.

The injection-moulding of the dust shield tube may be effected by injecting molten polypropylene plastics material by way of a two-part mould core into an annular space between the mould core and a cylindrical internal surface of an outer mould portion, the end faces of the two parts of the mould core being provided with symmetrically arranged recesses which interfit when the mould parts are brought together, and the radially outer end of each recess opening into a cavity in the respective part of the mould core in an arrangement such that each of the two rings of castellations is formed by means of the cavities of a respective one of the two parts of the mould core, whereby after cooling of the injected polypropylene plastics material the two parts of the mould core can be withdrawn in opposite axial directions without interference with the castellations, whereupon the injection-moulded dust shield tube can be ejected from the outer mould portion.

The invention also comprehends a telescopic shock absorber assembly in which an injection-moulded polypropylene dust shield tube as aforesaid is retained with a snap-in fit by means of its two rings of castellations on a flange member carried by a piston rod for the piston of a piston-and-cylinder telescopic shock absorber.

Figure 1:
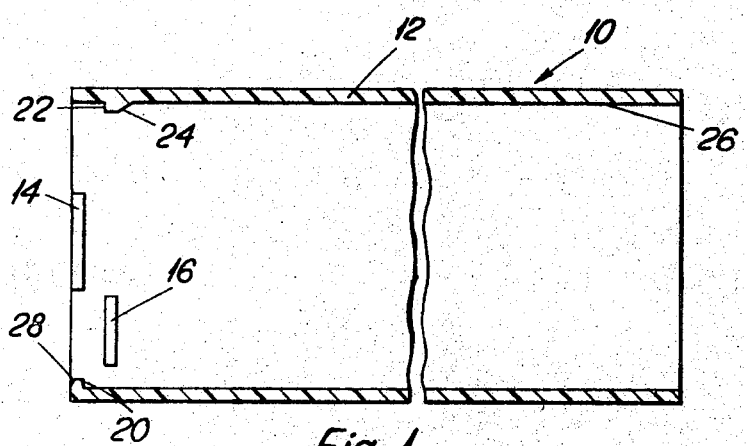
FIG. 1 is a fragmentary longitudinal section of one embodiment of a dust shield tube in accordance with the present invention.
Figure 2:
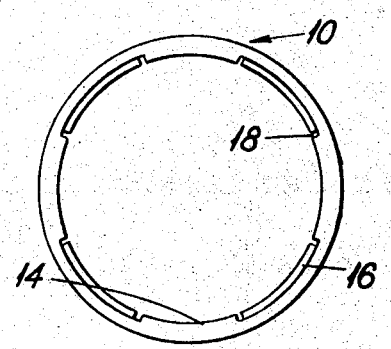
FIG. 2 is an end view of the dust shield tube shown in FIG. 1, showing two axially spaced rings of internal castellations.

As is shown for example in FIGS. 1 and 2 of the drawings, a dust shield tube, referred to generally as 10, for a telescopic shock absorber comprises a hollow cylindrical body portion 12 having at one end first and second rings of internal castellations 14 and 16 respectively, the first ring of castellations being an axially outer ring arranged at the end of the cylindrical body portion. Each of the rings of internal castellations 14 and 16 comprises four circumferentially equi-spaced internal projections, and the castellations of each ring are arranged alternately with the castellations of the other ring, whereby the centres of the castellations of each ring are displaced 45° circumferentially from the centres of the alternate castellations of the other ring. The circumferential lengths of the castellations are such that, as is shown in FIG. 2, there is a slight circumferential clearance 18 between the alternate castellations of the two rings as seen in end elevation of the dust shield tube.

Figure 4:
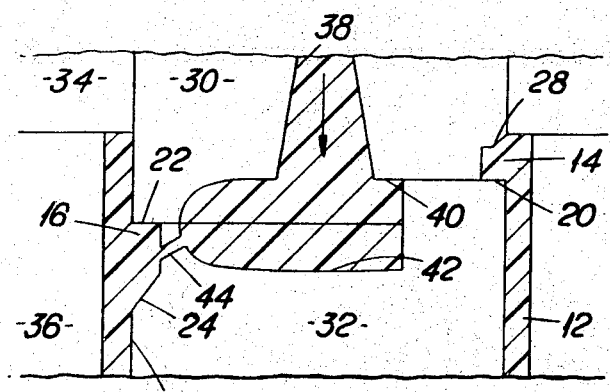
FIG. 4 is a fragmentary longitudinal section illustrating the relation of the mould parts during injection moulding.
Figure 5:
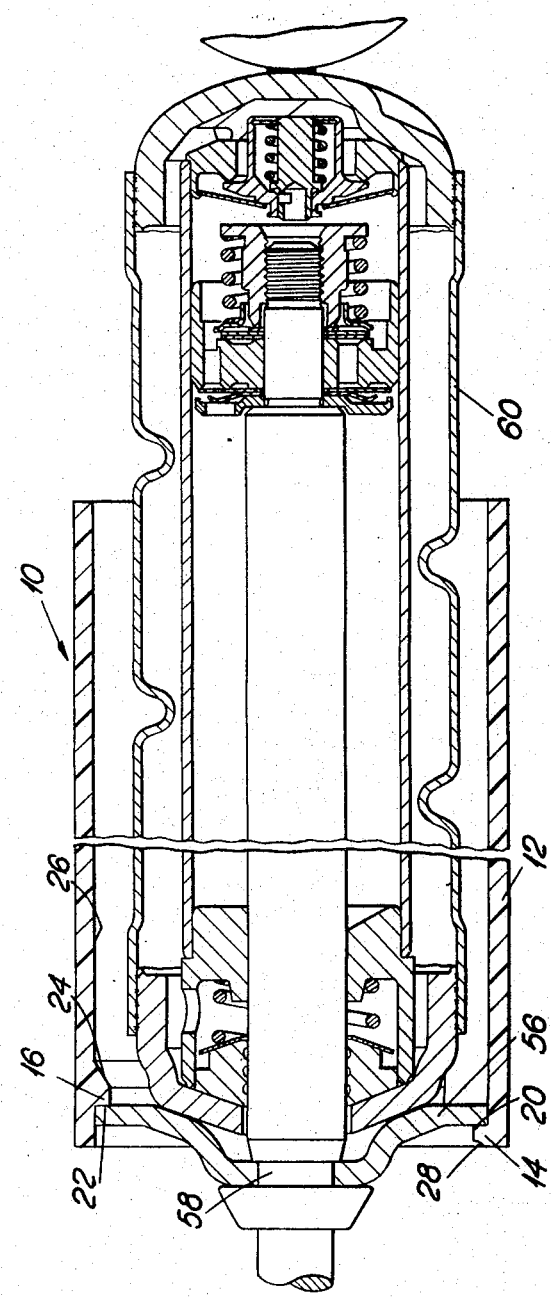
FIG. 5 is an enlarged fragmentary longitudinal section illustrating how the dust shield tube fits on to a flange member carried by the piston rod of a telescopic shock absorber.

As is also shown in FIG. 1, and rather more clearly in FIGS. 4 and 5, as seen in side elevation the facing axial end surfaces 20 and 22 of the castellations of the first and second rings 14 and 16 respectively extend in a direction radially of the longitudinal centre axis of the cylindrical body portion 12. The opposite axial end surfaces 24 of the castellations of the second ring 16, namely the surfaces of the castellations of this axially inner ring which face into the hollow interior of the cylindrical body portion 12, extend obliquely such that these opposite axial end surfaces 24 form segments of a circumferentially discontinuous annular ramp from the cylindrical internal surface 26 of the body portion 12 to the radially innermost portions of the castellations of the inner ring 16. The ramp angle is $180° - 30° = 150°$ with respect to the axial direction of the cylindrical internal surface 26.

The outwardly facing axial end surfaces 28 of the castellations of the first (outer) ring 14 comprise a radially inner radially extending portion and a radially outer obliquely extending portion.

Figure 3:
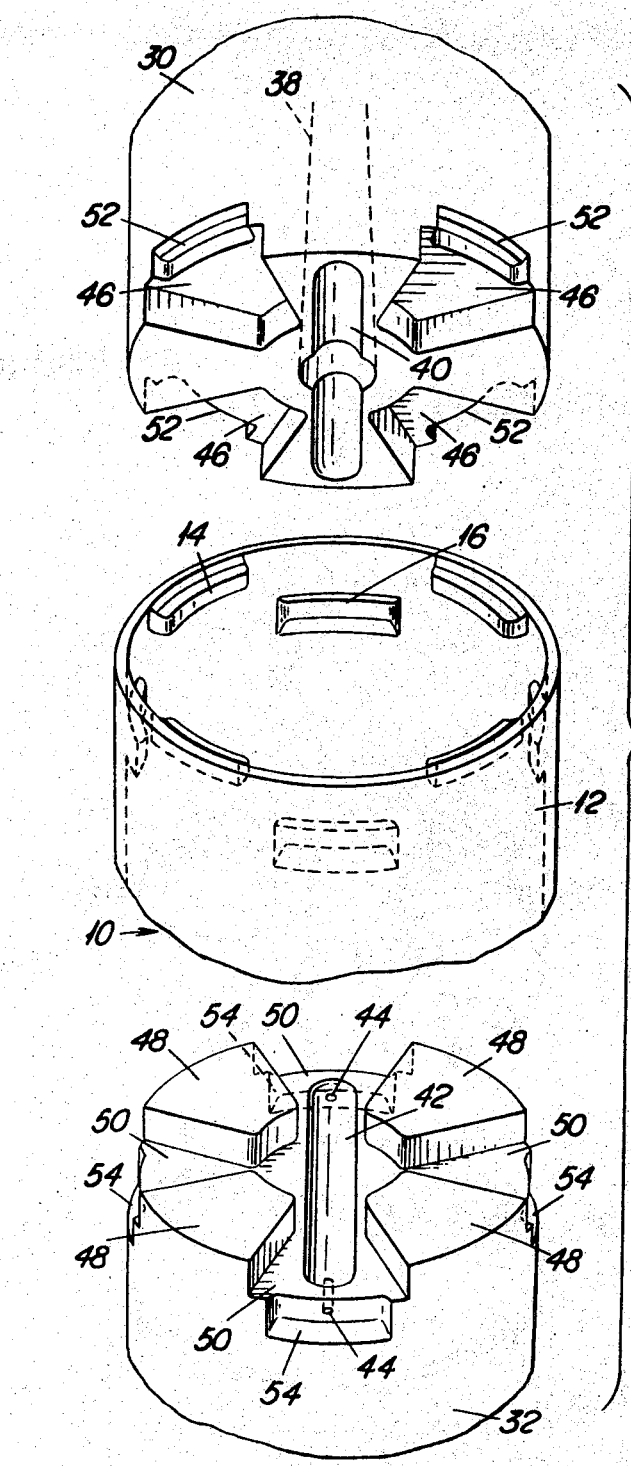
FIG. 3 is a fragmentary exploded view showing the castellations of the dust shield tube shown in FIGS. 1 and 2, and also showing the two parts of a two-part mould core which is used to form the castellations and, in conjunction with a stepped outer mould portion, a tubular body portion of the dust shield tube.

The dust shield tube 10 with its rings of internal castellations 14 and 16 is injection-moulded from polypropylene plastics material in a manner which is illustrated in FIGS. 3 and 4. As best seen in FIG. 4, first and second parts 30 and 32 of a two-part mould core are used to form the rings of castellations 14 and 16 and the internal cylindrical wall 26 of the hollow cylindrical body portion 12, and first and second parts 34 and 36 of a stepped outer mould portion are used to form the outer cylindrical wall of the body portion 12 and the axially end face of the body portion adjacent the first ring of internal castellations 14. For the injection moulding, with the various mould parts in the relative positions shown in FIG. 4, molten polypropylene plastics material which has been liquified by heating is injected through a slightly tapered feed passage 38 in the first part 30 of the mould core into a runner formed by mating depressions 40 and 42 in the two parts 30 and 32 of the mould core. At either end of the runner a gate 44 allows the molten material to run round the outside of the mould core and fill the space between the mould core and the outer mould portion, so forming the dust shield tube.

The method of forming the internal castellations is best illustrated in FIG. 3. The first part 30 of the mould core is formed with four symmetrically arranged sector-like recesses 46 which, when the mould parts 30 and 32 are brought together, interfit with correspondingly shaped projecting portions 48 of the mould part 32. Between the projecting portions 48, the mould part 32 has four sector-like recesses 50. The radially outer end of each recess 46 in the mould part 30 opens into a respective arcuate cavity 52 corresponding in shape to one of the internal castellations of the first ring 14, and correspondingly the radially outer end of each recess 50 in the mould part 32 opens into a respective arcuate cavity 54 corresponding in shape to one of the internal castellations of the second ring 16. The interfitting of the two parts 30 and 32 of the mould core is sufficiently close to prevent any moulded material from being present radially inwardly of the internal castellations, with the exception of sprue (from the feed passage, runner and gates) and possibly a little flash, which can readily be trimmed away.

The described method of forming the two rings 14 and 16 of internal castellations allows the two parts 30 and 32 of the mould core to be withdrawn, after the moulding operation, in opposite axial directions, without interference with the castellations, the arcuate cavities 52 and 54 used to form the castellations being open in the axial direction towards the end faces of the respective mould parts, so that there are no mould parts in a position likely to cause distortion of the newly formed castellations.

After withdrawal of the two parts of the mould core, the moulded dust shield tube is ejected from the outer mould portion in a conventional manner.

FIG. 5 illustrates how the dust shield tube 10 fits on to an annular external flange member 56 fixedly carried by a piston rod 58 of a telescopic piston-and-cylinder shock absorber (telescopic damper) referred to generally as 60. For assembly, the flange member 56 is passed through the length of the hollow interior of the cylindrical body portion 12 of the dust shield tube, until the annular ramp formed by the inclined surfaces 24 of the internal castellations of the second ring 16 causes distortion of the tube until the castellations of the second ring ride over the flange member, whereupon secure snap-in retention of the flange member is effected with a close fit between the radially extending facing surfaces 20 and 22 of the internal castellations of the first and second rings 14 and 16 respectively.

I claim:

1. A dust shield for a telescopic shock absorber comprising an elongated support, said support having an annular flange member extending radially outwardly from one end portion thereof, said flange member having substantially flat upper and lower surfaces adjacent to the periphery thereof, cover means entirely disposed around said elongated support and coextensive therewith, said cover means comprising a tube of an elastic plastic material having a cylindrical interior wall portion with an internal diameter at least equal to the external diameter of said annular flange member, first gripping means integral with said cylindrical interior wall portion of said tube extending radially inwardly thereof, second gripping means integral with said cylindrical interior wall portion of said tube and extending radially inwardly thereof, said second gripping means being axially positioned with respect to said first gripping means by a distance equal to the thickness of said annular flanged member to provide a space therebetween to receive the periphery of said flange member, said first and second gripping means having radially extending flat surfaces that face each other for contacting and gripping said flange member when installed therebetween, said first gripping means being formed with an inclined ramp on one side thereof for initial contact with the periphery of said flange member when said flange member is inserted axially into said tube to permit said flange member to radially deflect said tube so that said flange member can be subsequently trapped in said space by said first and second gripping means to thereby secure said tube to said flange member and around said support.

2. A dust shield for a telescopic shock absorber comprising an elongated cylindrical support, said support having an annular flange member extending radially outwardly from one end portion thereof, said flange member having substantially flat upper and lower surfaces adjacent to the periphery thereof, dust cover means for said elongated support, said cover means comprising an elongated tube of an elastic plastic material entirely disposed around said cylindrical support, said cover means having a cylindrical interior wall portion with an internal diameter at least equal to the external diameter of said annular flange member, first gripping means integral with said cylindrical interior wall portion of said tube projecting radially inwardly thereof, second gripping means integral with said cylindrical interior wall portion of said tube and projecting radially inwardly thereof, said second gripping means being axially spaced from said first gripping means by a distance equal to the thickness of said annular flange member to provide a space therebetween to receive the peripheral edge of said flange member, said first and second gripping means having radially extending flat surfaces that face each other for gripping said flange member when installed therebetween, said first gripping means being formed with inclined ramp means on one side thereof for initial contact with the periphery of said flange member when said flange member is inserted axially into said tube to permit said flange member to radially deflect said tube so that said flange member can be subsequently trapped in said space by said first and second gripping means to thereby secure said tube to said flange member concentric with respect to said support.

3. A shield according to claim 2 wherein said first gripping means comprises a first ring of spaced castillations integrally formed with said tube and said second gripping means comprises a second ring of spaced castillations integrally formed with said tube, said castillations of said second ring being axially aligned with the space between the castillations of said second ring, and each of said castillations of said second ring having an inclined wall disposed axially in said tube to form said ramp means.

4. A dust tube for a shock absorber comprising an elongated support, said support having an annular flange member extending radially therefrom, said flange member having substantially flat upper and lower surfaces adjacent to the periphery thereof, dust cover means entirely disposed around said elongated support and coextensive therewith, said cover means having a hollow tubular portion of an elastic plastic material, said hollow tubular portion having an internal diameter at least equal to the outer diameter of said annular flange member, a first ring of spaced projections integral with the inner wall of said tubular portion extending radially inwardly therefrom, a second ring of spaced projections integral with the inner wall of said tubular portion extending radially inwardly therefrom, said first and second rings of projections being axially spaced from each other by a distance equal to the thickness of said annular flange member to provide a space therebetween to receive the periphery of said flange member, said first and second spaced projections having radially extending flat surfaces that face each other for contacting and gripping the flat surfaces of said flange member when installed therebetween, said first ring of spaced projections having inclined ramps on one side thereof for initial contact with the periphery of said flange when said flange is inserted axially into said tube to permit said flange to deflect said tubular portion outwardly so that said flange can be subsequently trapped in said spaces by said first and second rings of spaced projections to thereby secure said cover to said flange concentric with said support.

* * * * *